United States Patent [19]
Odaka

[11] Patent Number: 5,666,185
[45] Date of Patent: *Sep. 9, 1997

[54] METHOD FOR RECORDING A DIGITAL AUDIO SIGNAL ON A MOTION PICTURE FILM

[75] Inventor: Kentaro Odaka, Tokyo, Japan

[73] Assignee: Sony Corporation, Tokyo, Japan

[*] Notice: The term of this patent shall not extend beyond the expiration date of Pat. No. 5,471,263.

[21] Appl. No.: 471,369

[22] Filed: Jun. 6, 1995

Related U.S. Application Data

[63] Continuation of Ser. No. 958,664, Oct. 8, 1992, Pat. No. 5,471,263.

[30] Foreign Application Priority Data

Oct. 14, 1991 [JP] Japan ................... 3-265001

[51] Int. Cl.⁶ ............. G03B 31/02; G11B 7/007; G11B 20/12; G11B 20/18
[52] U.S. Cl. ............. 352/27; 360/3; 360/32; 360/48; 360/53
[58] Field of Search ............. 352/1, 5, 8, 11, 352/26, 27, 37; 360/3, 32, 53, 48

[56] References Cited

U.S. PATENT DOCUMENTS

| | | | |
|---|---|---|---|
| 3,502,398 | 3/1970 | Michelson | 352/37 |
| 3,932,032 | 1/1976 | Weinstein | 352/11 |
| 4,074,085 | 2/1978 | Russell | 369/95 |
| 4,202,018 | 5/1980 | Stockham, Jr. | 371/10.1 |
| 4,306,781 | 12/1981 | Mosely | 352/37 |
| 4,461,552 | 7/1984 | Levine | 352/27 |
| 4,491,399 | 1/1985 | Bell | 352/92 |
| 4,553,833 | 11/1985 | Kanaoka et al. | 355/40 |
| 4,600,280 | 7/1986 | Clark | 352/37 |
| 4,622,598 | 11/1986 | Doi et al. | 360/22 |
| 4,634,850 | 1/1987 | Pierce et al. | 235/487 |
| 4,659,198 | 4/1987 | Beauviala et al. | 352/92 |
| 4,697,212 | 9/1987 | Osawa et al. | 360/48 |
| 4,870,633 | 9/1989 | Matsushita et al. | 369/59 |
| 4,893,199 | 1/1990 | Okada | 360/48 |
| 5,113,293 | 5/1992 | Endo et al. | 360/32 |
| 5,155,510 | 10/1992 | Beard | 352/27 |
| 5,327,182 | 7/1994 | Kohut et al. | 352/27 |
| 5,347,403 | 9/1994 | Uekusa | 360/3 |
| 5,471,263 | 11/1995 | Odaka | 352/27 |

FOREIGN PATENT DOCUMENTS

| | | | |
|---|---|---|---|
| 0 188 627 A1 | 7/1986 | European Pat. Off. | G11B 20/12 |
| 0 040 188 A1 | 8/1986 | European Pat. Off. | G03B 31/02 |
| 0 191 410 A3 | 8/1986 | European Pat. Off. | G11B 20/18 |
| 0 349 325 A2 | 1/1990 | European Pat. Off. | G11B 20/10 |
| WO-A-9 116 709 | 1/1991 | WIPO | G11B 20/12 |
| WO-A-9 105 335 | 4/1991 | WIPO | G11B 7/00 |
| WO92/06409 | 4/1992 | WIPO | G03B 31/00 |
| WO92/14239 | 8/1992 | WIPO | G11B 7/00 |

OTHER PUBLICATIONS

"Digital-Optical Data Makes Movies Sound Better," *Machine Design*, Feb. 21, 1991, vol. 63, No. 4, Cleaveland, Ohio, US, pp. 30–31.

"Cinema Digital Sound—Premiere eines neuen Lichtonverfahrens in Brussel," *Fernseh–Und Kino–Technik*, Jan. 1991, vol. 45, No. 1, Heidelberg, Germany, pp. 30–33, 36 and 37.

(List continued on next page.)

*Primary Examiner*—W. B. Perkey
*Attorney, Agent, or Firm*—Limbach & Limbach L.L.P.

[57] ABSTRACT

Digital audio signals and a conventional audio track are recorded on a motion picture film by error correction encoding digital audio data to be recorded on the film, sequentially arranging the error encoded digital audio data in a direction perpendicular to the direction of advancement of the film by utilizing two areas or more of an area in the vicinity of one end of the film which is parallel with the other end of the film and which is laid between it and one end portion of an analog sound track or an area near the other end of the analog sound track, and recording the same.

27 Claims, 10 Drawing Sheets

OTHER PUBLICATIONS

Dr. Ing. Klaus–Peter Anders, "DOSCAR—A Digital Optical Sound Technique," *Image Technology* (Journal of BKSTS), Jun. 1991, vol. 73, No. 6, London, Great Britain, pp. 208–213.

"Cinema Digital Sound," *Image Technology* (Journal of the BKSTS), Jul. 1990, vol. 72, No. 7,London, Great Britain, pp.69–70.

SMPTE Journal, vol. 99, No. 11, Nov. 1990, Scarsdale, NY, USA, pp. 899–908; Wiles et al.: "Digital Optical Sound on 355mm Motion–Picture Film."*.

1

METHOD FOR RECORDING A DIGITAL AUDIO SIGNAL ON A MOTION PICTURE FILM

This is a continuation of application Ser. No. 07/958,664, filed Oct. 8, 1992, now U.S. Pat. No. 5,471,263.

BACKGROUND OF THE INVENTION

1. Field of the Invention

The present invention relates to a digital audio signal recording method suitably applied to the case such that an audio signal is recorded on an audio track of a motion picture film in a digital fashion.

2. Description of the Related Art

In motion picture films, an analog audio signal of about two channels is recorded on a so-called sound track which is formed in the vicinity of a video recording portion.

According to the recent progress in digital audio technologies, it is known that an audio signal is converted into digital data and then recorded on a recording medium such as a magnetic tape or the like. Also in the motion pictures, it is requested that an audio signal can be recorded on a motion picture film in the form of a digital signal.

In the case of the motion picture film, however, the sound track on which the analog audio signal is recorded cannot be substantially removed from such a standpoint as to maintain a compatibility with existing film projection apparatus. Therefore, a new track on which digital audio data can be recorded must be prepared in other portion than the sound track.

U.S. Pat. No. 4,600,280 describes a technique in which a digital audio signal is recorded on a motion picture film together with a conventional sound track. Also, U.S. Pat. No. 5,101,397 describes a technique in which an audio signal is recorded in the form of digital audio signal. Furthermore, U.S. Pat. No. 4,461,552 describes a technique in which an audio signal is encoded according to the pulse-code-modulation (PCM) system and then optically recorded on a film. However, the above-mentioned prior arts all fail to disclose an arrangement in which words forming a digital audio signal are properly arranged on a film or addition and arrangement of an error detection and/or error correction for avoiding data error.

OBJECTS AND SUMMARY OF THE INVENTION

Therefore, it is an object of the present invention to provide a method for recording a digital audio signal on a motion picture film in which the aforesaid shortcomings and disadvantages encountered with the prior art can be eliminated.

More specifically, it is an object of the present invention to provide a method for recording a digital audio signal on a motion picture film in which, when a digital audio signal is optically recorded on a motion picture film or the like, digital audio data is separately recorded on a plurality of areas so that digital data of a large amount can be recorded.

It is another object of the present invention to provide a method for recording a digital audio signal on a motion picture film in which digital audio data is encoded so as to have error-detection and/or error-correction codes and then recorded so that data error can be avoided.

According to an aspect of the present invention, a digital audio signal of a plurality of channels is recorded on a motion picture film. Digital audio data is interleaved and recorded on the direction perpendicular to respective tracks formed along the travel direction of the motion picture film and parity words, used to detect and/or correct data error are generated and added to the data.

According to the above-mentioned arrangement, a plurality of tracks are formed by effectively utilizing portions which are not yet utilized in the motion picture film or the like. Therefore, the digital audio signal can be arranged in a block fashion and then efficiently recorded by utilizing the plurality of tracks.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, wherein.

DETAILED DESCRIPTION OF THE PREFERRED EMBODIMENTS

Embodiments of the present invention will hereinafter be described with reference to FIGS. 1 through 10.

Figure 1:
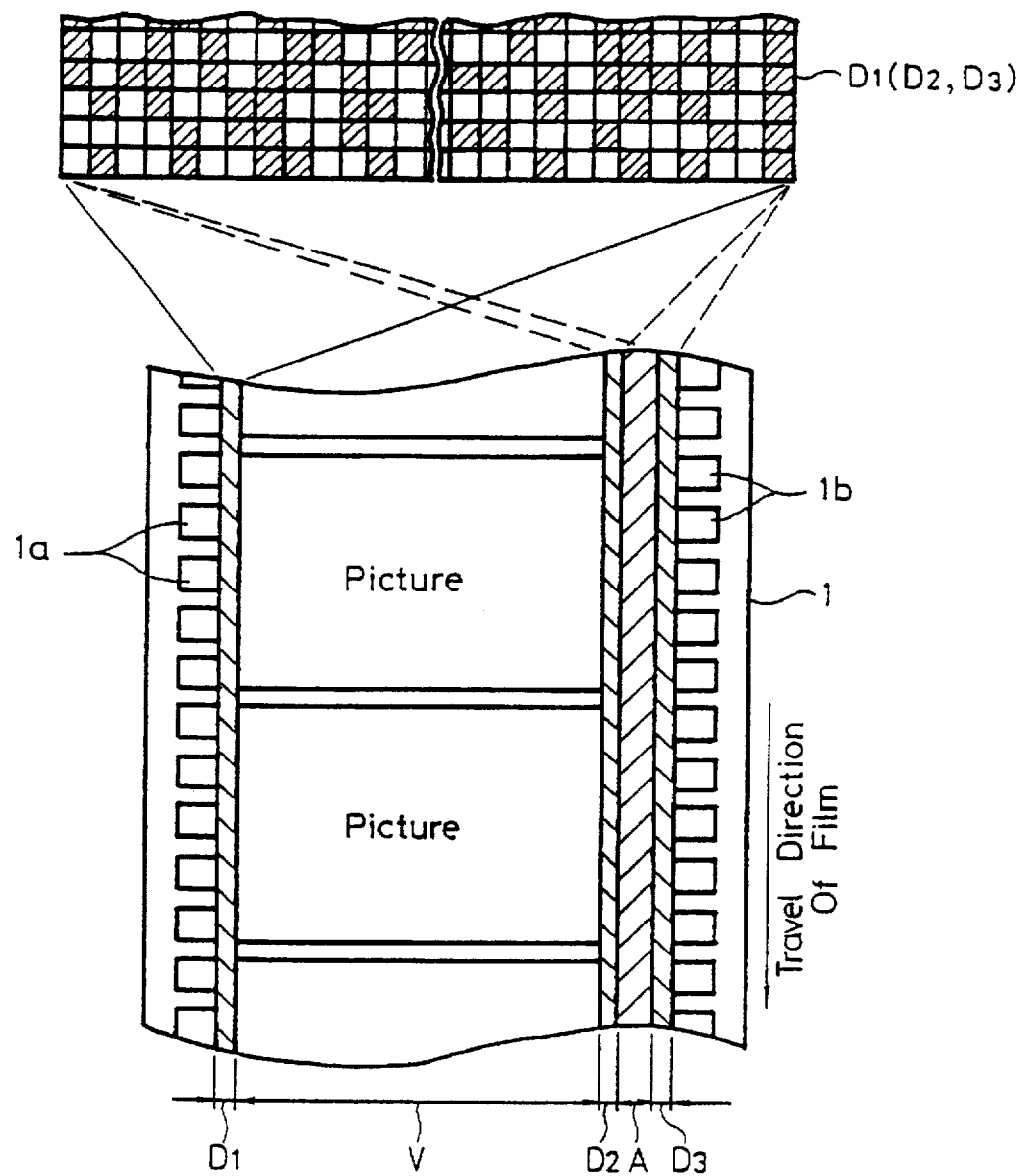
FIG. 1 is a format of an audio data track according to an embodiment of the present invention.

FIG. 1 of the accompanying drawings shows a track format under which digital audio data is recorded on a motion picture film. As shown in FIG. 1, a video recording portion V is formed on substantially a central portion of a motion picture film 1. An analog audio track A is formed at one end edge of the video recording portion V. An analog audio signal is optically recorded on the analog audio track A. Perforations 1a, 1b are formed on both end edge portions of the motion picture film 1 at a predetermined interval. A first digital audio data recording track D1 is formed on the motion picture film 1 between the perforations 1a and the video recording portion V. A second digital audio data recording track D2 is formed on the motion picture film 1 between the video recording portion V and the analog audio track A. A third digital audio data recording portion D3 is formed on the motion picture film 1 between the analog audio track A and the other perforations 1b.

In this embodiment, assuming that the width of the motion picture film 1, for example, is 35 mm, then the width of the first digital audio data recording track D1 is 425 μm, the width of the second digital audio data recording track D2 is 660 μm and the width of the third digital audio data recording track D3 is 410 μm, respectively.

Digital audio data of a predetermined number are separately recorded on the respective digital audio date recording tracks D1 to D3. The respective recording tracks D1 to D3 further include tracks corresponding to respective words of digital audio data. White or black patterns are exposed on the respective tracks in response to bits of respective words, thereby data being recorded.

Figure 2:
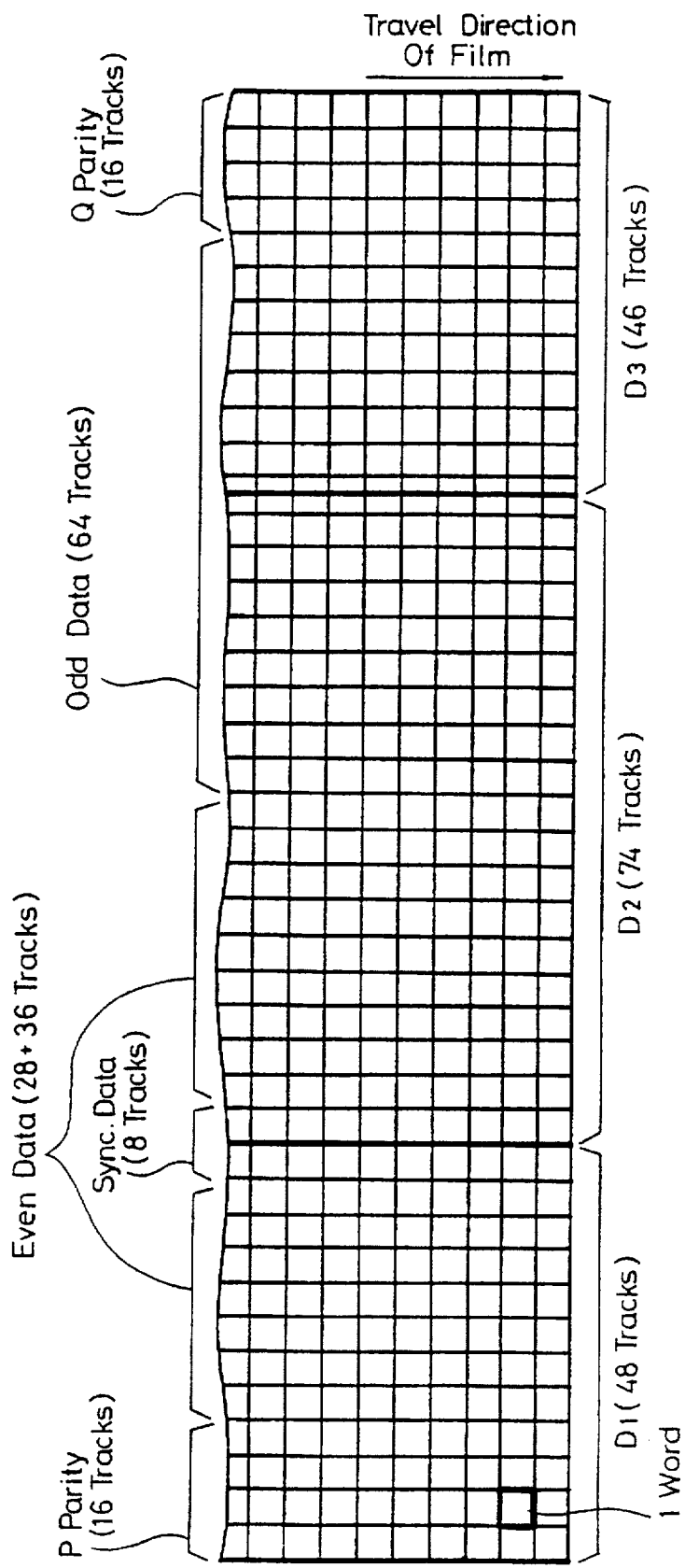
FIG. 2 is an explanatory diagram showing a structure of a track according to the embodiment of the present invention.

FIG. 2 of the accompanying drawings shows the respective recording tracks D1 to D3 that are located close to each other in order to understand more clearly the whole arrangement of audio data separately arranged on the first to third digital audio data recording tracks D1 to D3. In FIG. 2, a square region shows one word forming digital audio data. In this embodiment, each word is composed of 16-bit data of 4 bits×4 tracks. Accordingly, there are formed tracks corresponding to respective bits. In this embodiment, there are formed 168 tracks in total in the direction perpendicular to the direction in which the motion picture film 1 is transported.

Figure 3:
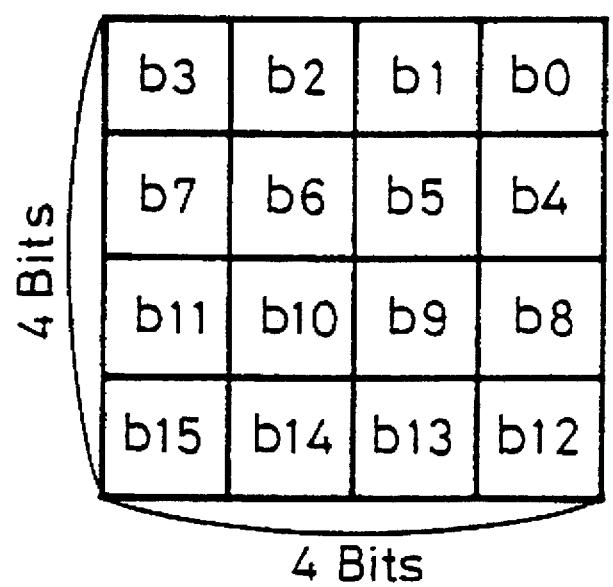
FIG. 3 is an explanatory diagram showing a structure of one word according to the embodiment of the present invention.

FIG. 3 of the accompanying drawings shows a structure of the above-mentioned one word. As shown in FIG. 3, one word comprises 4 bits in the longitudinal direction and 4 bits in the horizontal direction, i.e., 16 bits in total. In one word which constructs digital audio data, $b_{15}$ (MSB) to $b_0$ (LSB) of 16-bit data are arranged as shown in FIG. 3.

In FIG. 2, the first digital audio data recording track D1 is composed of 48 tracks (12 words). The second digital audio data recording track D2 is composed of 74 tracks (18.5 words). The third digital audio data recording track D3 is composed of 46 tracks (11.5 words). Accordingly, in the digital audio data recording tracks D1, D2 and D3, data of 48 bits, 74 bits and 46 bits are respectively arranged in the direction (horizontal direction) perpendicular to the direction in which the motion picture film 1 is advanced. According to the above track format, data of one bit occupies a square region one side of which is about 9 μm and one word occupies a square one side of which is about 36 μm.

As shown in FIG. 2, on 16 tracks (4 words) from the left end of the first digital audio data recording track D1, there is recorded a first parity (P parity) that is used to detect and/or correct error in digital audio data. Audio data is recorded on the following 28 tracks and synchronizing (sync.) data is recorded on the next 4 tracks (one word).

Sync. data is recorded on 4 tracks (one word) from the left end of the second digital audio data recording track D2. Audio data is recorded on the 70 tracks (17.5 words) which follow.

On 30 tracks (7.5 words) from the left end of the third digital audio data recording track D3, there is recorded audio data. A second parity (Q parity) that is used to detect and/or correct error in digital audio data is recorded on the remaining 16 tracks (4 words).

In this embodiment, as the sync. data recorded on the right end portion of the recording track D1 and the left end portion of the recording track D2, there is utilized sync. data of the constant bit pattern which is used to detect the positions of the recording tracks D1 and D2. That is, as shown in FIG. 1, the video signal recording portion V is located between the first and second digital audio data recording tracks D1 and D2 and these recording tracks D1, D2 are thereby spaced apart. Therefore, the sync. data are respectively recorded on the first and second recording tracks D1, D2 so as to facilitate the reproduction of data. Incidentally, since a gap between the second and third digital audio data recording tracks D2 and D3 is relatively small, the data recorded on the third digital audio data recording track D3 can be reproduced with ease on the basis of the sync. data recorded on the second digital audio data recording track D2.

According to this embodiment, digital audio data of 8 channels can be recorded on the motion picture film 1. A data format for recording 8-channel digital audio data will be described with reference to FIGS. 4 and 5.

Figure 4:
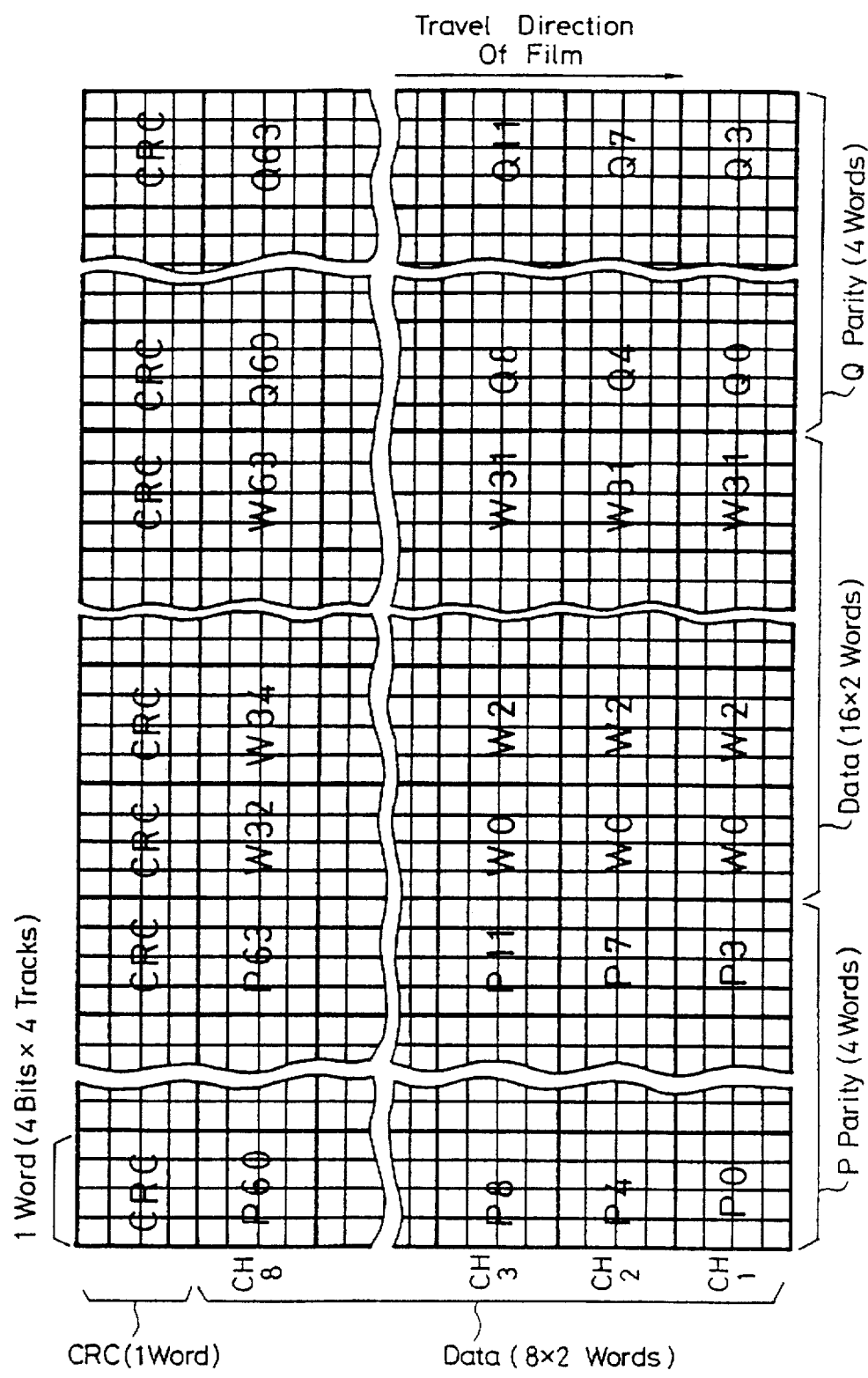
FIG. 4 is a diagram showing a data format in a plurality of channels according to the embodiment of the present invention.

FIG. 4 of the accompanying drawings shows respective data located on respective channels at the unit of bits (sync. data is not shown).

Figure 5:
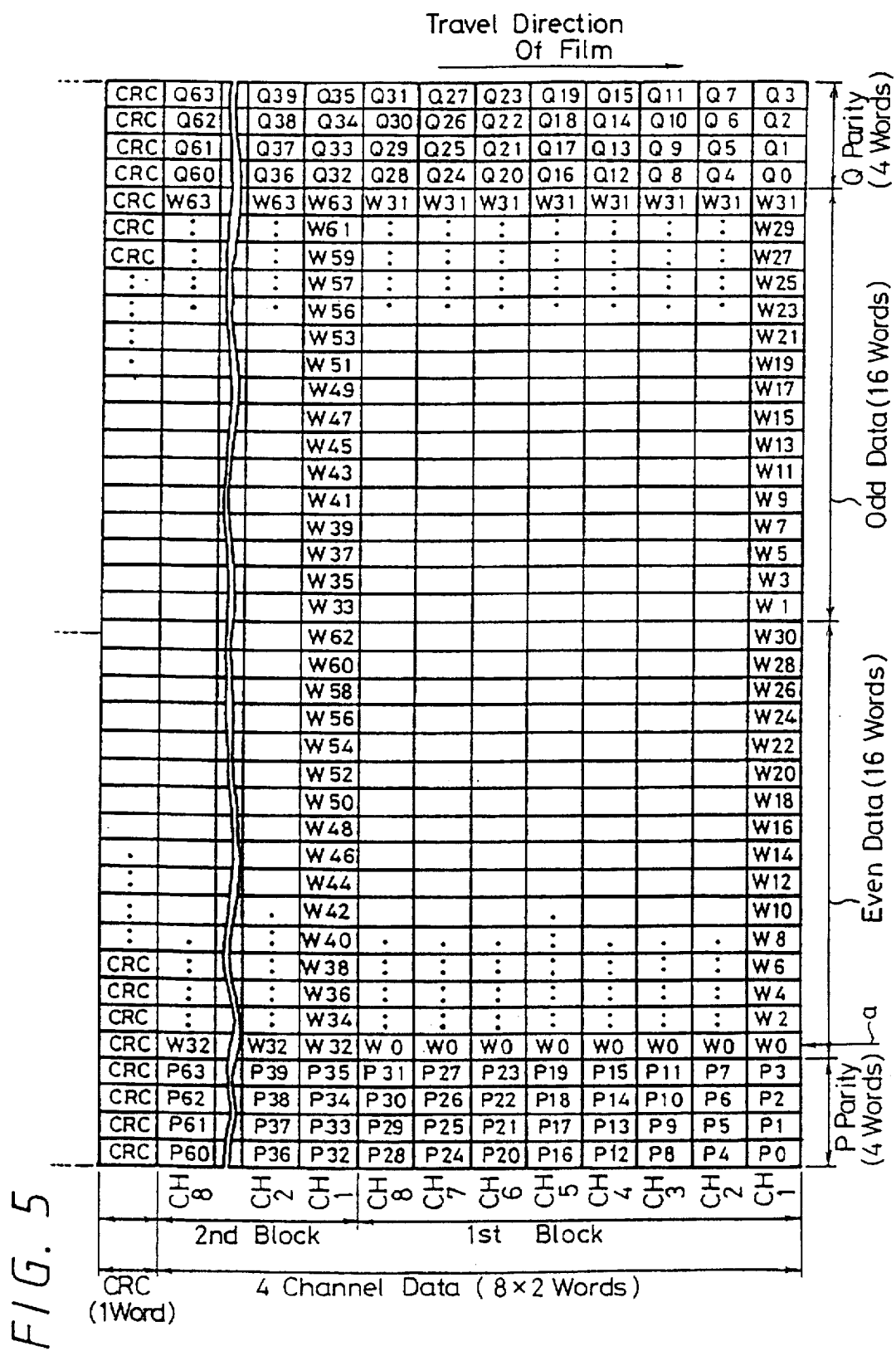
FIG. 5 is a diagram used to explain the location of respective words according to the embodiment of the present invention.

FIG. 5 of the accompanying drawings shows respective data located on respective channels at the unit of words (sync. data is not shown).

In this embodiment, as shown in FIGS. 4 and 5, audio data of 8 channels are sequentially recorded on the tracks at every channel in the direction (horizontal direction in FIGS. 4 and 5) perpendicular to the direction in which the motion picture film 1 is advanced. A word sequence in the horizontal direction and shown on the lowermost end of FIG. 5 shows the audio data of the first channel. In this word sequence, from the left end thereof, there are recorded P parity words (P0, P1, P2, P3) of 4 words, in that order. Subsequently, data W0, W1, ..., W31) of 32 words (32 samples) which construct the first channel (CH1) are recorded which are further followed by Q parity words (Q0, Q1, Q2, Q3) of 4 words. At that time, the data (W0 to W31) of 32 words are recorded in a so-called interleave recording fashion so that data (W0, W2, W30) of even words and data (W1, W3, ..., W31) of odd words are respectively separated. Therefore, from the left end of the audio data recording area, there are recorded data (W0, W2, ..., W30) of even words and data (W1, W3, ..., W31) of odd words, sequentially in that order.

In FIG. 5, there are provided the P parity words (P0, P1, P2, P3) which are used to error-detect and/or error-correct data sequence located in the horizontal direction. Also, in FIG. 5, there are provided the Q parity words (Q0, Q1, Q2, Q4) which are used to error-detect and error-correct data sequence located in the oblique direction of data that are arranged in a two-dimensional fashion with respect to the transport direction of the motion picture film 1 and the direction perpendicular to the direction in which the motion picture film 1 is advanced. How to generate the P and Q parity words will be described in detail later on.

On the second channel, there are recorded data (W0, W1, ... W1) of 32 words, P parity words (P4 to P7) and Q parity words (Q4 to Q7) similarly to the first channel. Also in this case, the data (W0 to W31) are interleaved to data of even words and data of odd words and then recorded. In a like manner, 32-word data (W0 to W31), P parity words and Q parity words are respectively recorded up to the eighth channel.

In the next word sequence of the horizontal direction which follows the word sequence of the eighth channel (CH8), there are recorded data (W32, W33, ..., W63) of 32 words, P parity words (P32 to P35) and Q parity words (Q32 to Q35) constructing the first channel (CH1) thereof. The data (W32 to W63) of 32 words are audio data which are continuous to the word sequence (W0 to W31) of the above first channel CH1. Also in this case, data (W32 to W63) are interleaved to data of even words and data of odd words and then recorded. Similarly, data (W32 to W63) are recorded in 32 words each together with P and Q parity words up to the eighth channel (CH8).

Error detection codes formed of CRC (cyclic redundancy check) codes are generated and recorded after two blocks of one data block from the first channel (CH1) to the eighth channel (CH8) located in the horizontal direction. In this case, the CRC codes are generated to and added to the respective tracks which are formed along the travel direction of the motion picture film 1.

Figure 6:
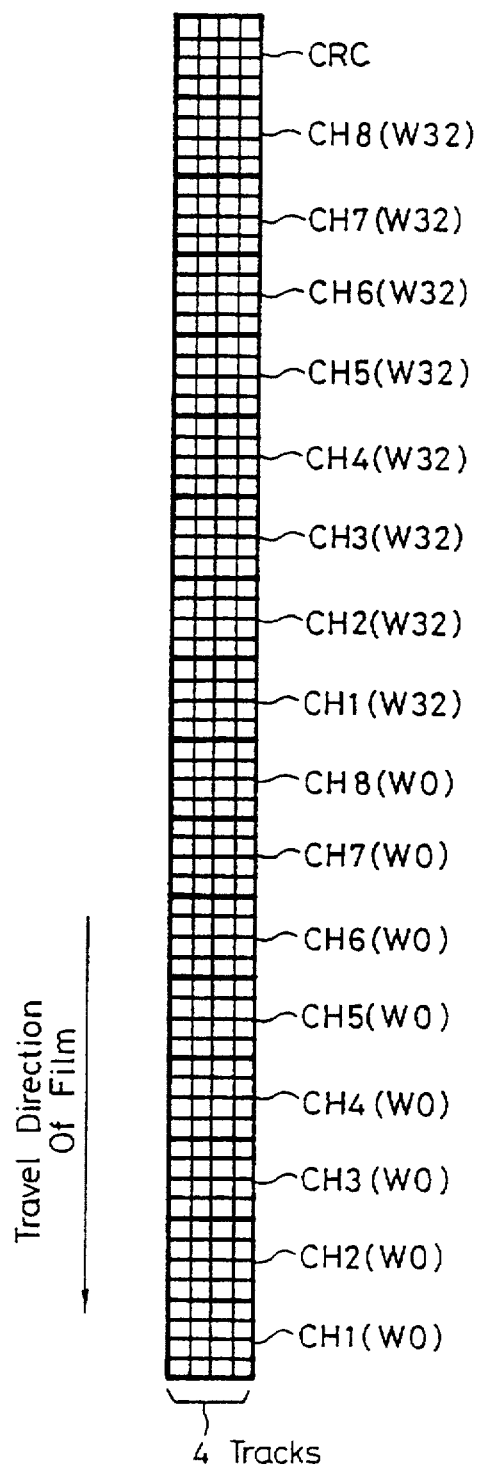
FIG. 6 is a diagram used to explain the location of CRC code according to the embodiment of the present invention.

FIG. 6 of the accompanying drawings shows the condition such that the CRC code is added to respective words located in the direction shown by an arrow a in FIG. 5.

As shown in FIG. 6, one word is composed of 4 tracks. The CRC code is generated to and added to 16 words which comprise words W0 of 8 channels from the first channel (CH1) to the eighth channel (CH8) constructing the first data block and words (W32) of 8 channels from the first channel (CH1) to the eighth channel (CH8) constructing the second data block.

The first data block, the second data block and the CRC code are repeatedly and sequentially recorded in response to the travel of the motion picture film 1.

Figure 7:
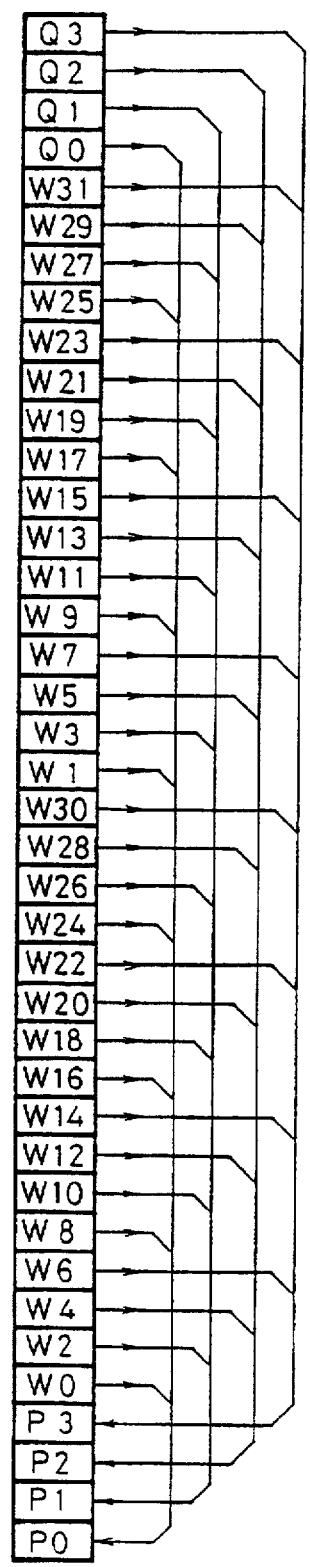
FIG. 7 is a diagram used to explain how to generate P parity words according to the embodiment of the present invention.

How to generate and add the P parity words will be described with reference to FIG. 7. FIG. 7 of the accompanying drawings shows one word sequence in the horizontal direction shown in FIG. 5. As shown in FIG. 7, the P parity word P0 is generated from the data W0, W8, W16, W24, W1, W9, W17, W25 arranged at every four words and the Q parity word Q0.

Similarly, the P parity word P1 is generated on the basis of data W2, W10, W18, W26, W11, W19, W27 which are arranged at every four words and the Q parity word Q1. The P parity words P2, P3 are similarly generated on the basis of data of word sequence in which words are arranged at every four words.

How to generate the Q parity words (Q0, Q1, Q2, Q3) will be described with reference to FIG. 8.

Figure 8:
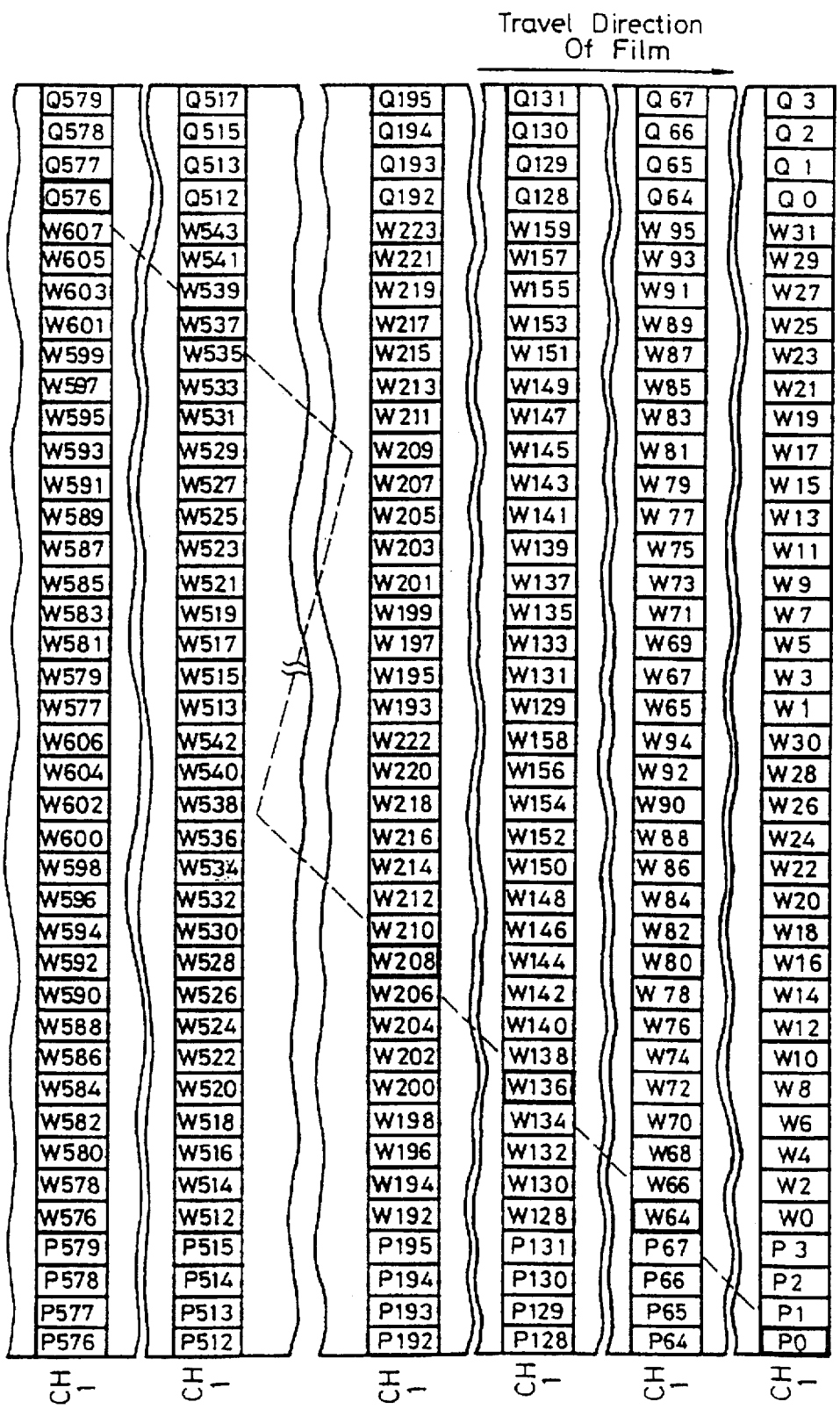
FIG. 8 is a diagram used to explain how to generate Q parity words according to the embodiment of the present invention.

FIG. 8 of the accompanying drawings shows only the word sequences of the horizontal direction in which data of the first channels (CH1) are recorded. As shown in FIG. 8, this word sequence comprises a word sequence in which data W0 to W31 of the first channel (CH1) are recorded, a word sequence in which data W64 to W95 of the first channel are recorded, a word sequence in which data W128 to W159 of the first channel CH1 are recorded, . . .

Considering a Q parity word 576 within Q parity words 576 to 579 added to the word sequence of the horizontal direction in which data W576 to W607 of the first channel CH1 are recorded, it is seen that the Q parity word 576 is generated on the basis of 9 words which are composed of the P parity word P0, data W64, data W208, . . . , data W537 as coupled by a broken line in FIG. 8. Other Q parity words are similarly generated and then interleaved.

Equations for generating the P parity words and the Q parity words will be described below.

$$P_{4(l-1)+32m+n} = W_{l,32m+2n} + W_{l,32m+2n+1} + W_{l,32m+2n+8} +$$
$$W_{l,32m+2n+9} + W_{l,32m+2n+16} + W_{l,32m+2n+17} +$$
$$W_{l,32m+2n+24} + W_{l,32m+2n+25}$$

-continued
$$Q_{4(l-1)+32m+n+576} = P_{4(l-1)+32m+n} + W_{l,32m+2n+64} +$$
$$W_{l,32m+2n+136} + W_{l,32m+2n+208} +$$
$$W_{l,32m+2n+280} + W_{l,32m+2n+321} +$$
$$W_{l,32m+2n+393} + W_{l,32m+2n+465} +$$
$$W_{l,32m+2n+537}$$

where X in PX, QX depict each of parity word numbers, X in WX, Y depicts a channel number at which the word is located, Y depicts the word number, 1 depict the channel numbers 1 to 8, m depicts the integers from 0 to infinity and n depicts 0, 1, 2 and 3.

In this way, digital audio data of 8 channels are divided, arranged and then optically recorded on the digital audio data recording tracks D1, D2 and D3.

Figure 9:
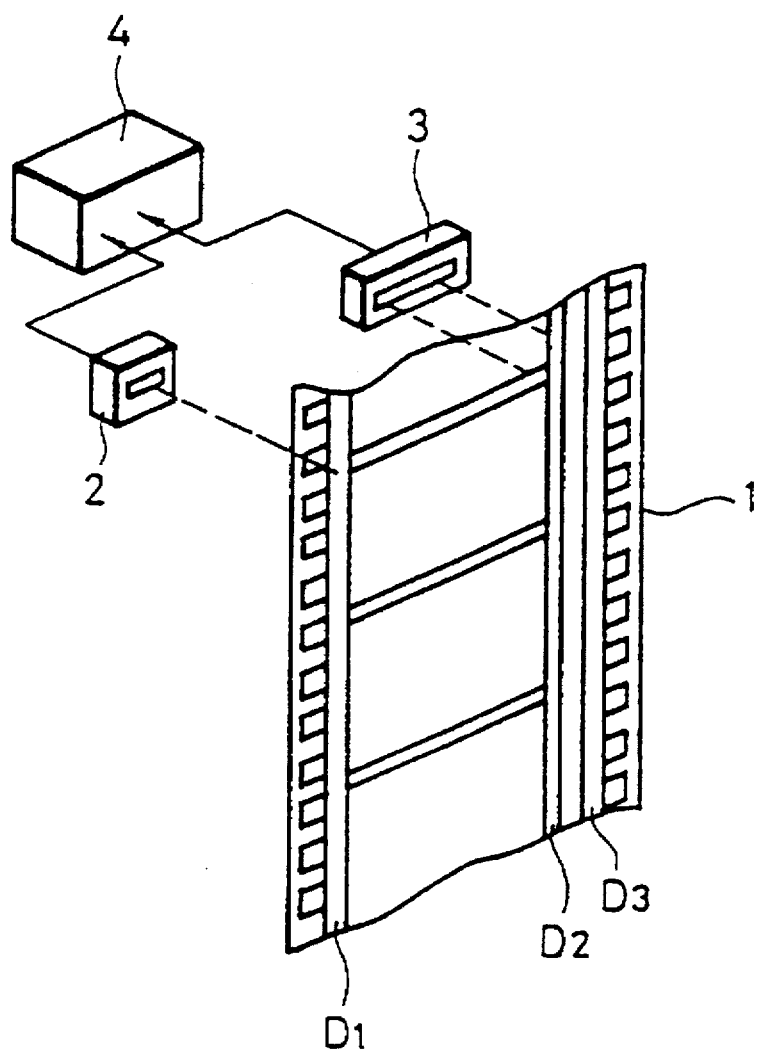
FIG. 9 is a diagram showing an arrangement of a reproducing apparatus according to the embodiment of the present invention.

FIG. 9 of the accompanying drawings shows an arrangement of a reproducing apparatus that reproduces the digital audio data recorded on the recording tracks D1, D2 and D3 of the motion picture film 1.

As shown in FIG. 9, first and second CCD (charge-coupled device) line sensors 2 and 3 are disposed in the midst of the transport system of the motion picture film 1. The first CCD line sensor 2 is disposed at the position corresponding to the first digital audio data recording track D1 and the second CCD line sensor 3 is disposed at the position corresponding to the second and third digital audio data recording tracks D2 and D3. That is, since the second digital audio data recording track D2 and the third digital audio data recording track D3 are disposed close to each other, the data thereof can be detected by one CCD line sensor 3. Data of respective tracks detected by the respective CCD line sensors 2 and 3 are supplied to a digital data processor apparatus 4. In this digital data processor apparatus 4, digital audio data, recorded on the motion picture film 1, are reproduced on the basis of sync. data and digital audio data are error-detected and/or error-corrected on the basis of the P parity words, Q parity words and CRC codes, thereby reproducing the digital audio data of 8 channels. In this embodiment, the error detection is carried out mainly by the CRC codes.

Since each word formed of 16 bits and relating to the error-detection and error-correction is recorded on the motion picture film 1 in a square configuration of 4 bits each in the longitudinal and horizontal directions, an error rate of erroneous data caused by a scratch in the longitudinal direction of the film is reduced to ¼ as compared with the case such that each word formed of 16 bits is arrayed on one track in a line. Similarly, as compared with the case such that each word of 16 bits are arranged over the 16 tracks, an error rate of erroneous data caused by a scratch in the width direction of the film can be minimized. Further, since data of even words and data of odd words are interleaved, data can be interpolated with ease.

In addition, each track of the P parity words is generated along the horizontal direction of (i.e., width direction of the film) so that, even when an unnecessary portion of the film in the width direction is removed and the films are connected upon edition, the error correction can be carried out on the basis of at least the P parity words and the error correction becomes possible in the vicinity of edit-in. Further, since the Q parity words are interleaved during a long period Of time and then generated in the longitudinal direction of the film, a powerful error correction can be made.

Figure 10:
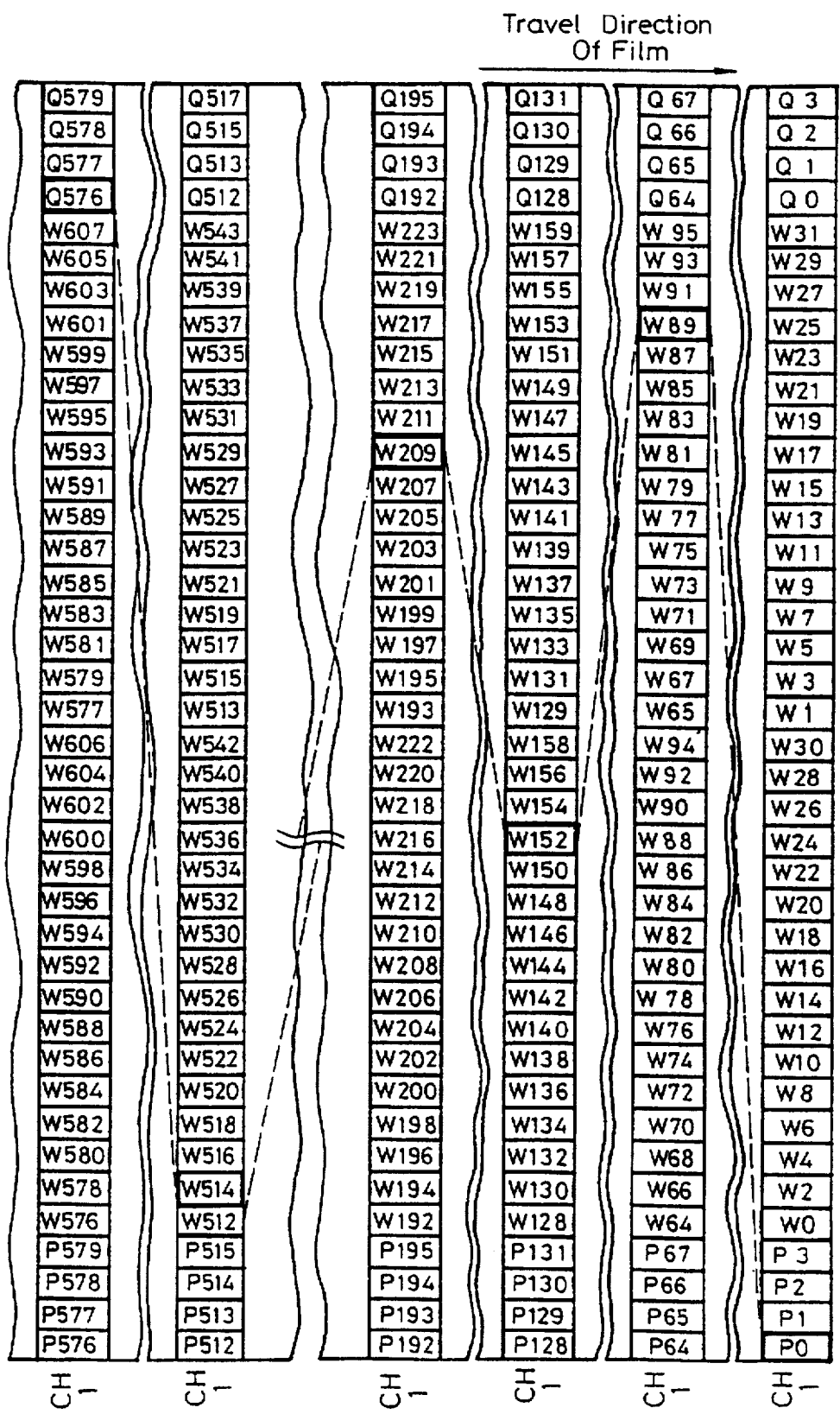
FIG. 10 is a diagram used to explain how to generate Q parity words according to another embodiment of the present invention.

While the positions (track) of words that are utilized to generate the Q parity words are sequentially displaced toward the right side in accordance with the word sequences of the horizontal direction according to the embodiment shown in FIG. 8, the present invention is not limited thereto and the positions (track) of words that are utilized to generate the Q parity words may be alternately displaced right and left in a zigzag fashion as shown by broken lines in FIG. 10. According to this technique, data can be interleaved in a more complex fashion, thereby making it possible to perform a more powerful error correction.

While data constructing each word are arranged in a two-dimensional fashion as in 4 bits×4 bits and then recorded as described above, data are not always arranged in a square fashion. However, if data are recorded in a two-dimensional fashion substantially similar to the square, then any errors caused by scratches in the longitudinal and horizontal directions can be corrected satisfactorily as described above.

Further, while digital audio data of 8 channels are dispersed and recorded on a number of tracks, i.e., 160 tracks (excepting the tracks for sync. data) as described above, the number of tracks and the number of channels are not limited to those in the above embodiments. As described in the above embodiments, the present invention can achieve remarkable effects when data are recorded on tracks whose number is several 10s of times the number of channels.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for recording a digital audio signal including words on a motion picture film having a direction of travel, the motion picture film including two opposed edges, and a picture area, the picture area including two opposed edges parallel to the opposed edges of the motion picture film, the digital audio signal being recorded in addition to a conventional analog soundtrack formed in the direction of travel, the analog soundtrack having two opposed edges, the method comprising the steps of:

(a) adding error correction words to the digital audio signal, the words of the digital audio signal and the error correction code words collectively constituting words of a coded digital audio signal, the words of the coded digital audio signal each including bits;

(b) arraying the bits of each of the words of the coded digital audio signal in a rectangular array to provide rectangularly-arrayed words;

(c) sequentially arranging each rectangularly-arrayed word of the coded digital audio signal into two or more rows, each row including one or more bits of the word; and (d) recording each rectangularly-arrayed word as a rectangular array of bits in a digital soundtrack located on the motion picture film in an area other than the picture area and the analog soundtrack, the bits of each row of the rectangularly-arrayed words being recorded in the digital soundtracks in a direction perpendicular to the direction of travel and successive ones of the two or more rows of the rectangularly-arrayed words being recorded in the direction of travel, such that the bits of each rectangularly-arrayed words are arrayed at least in the direction of travel, and successive ones of the rectangularly-arrayed words are recorded in the direction of travel.

2. The method according to claim 1, wherein the step of adding error code to the digital audio signal includes the steps of:

generating first parity words; and adding the first parity words to the digital audio signal as the error correction code words.

3. The method according to claim 2, wherein:

in the step of generating first parity words, each of the first parity words is generated in response to selected words of the digital audio signal; and in the step of sequentially arranging the rectangularly-arrayed words of the coded digital audio signal, the selected words and the first parity words are all arranged in one row.

4. The method according to claim 1, wherein the step of adding error correction code to the digital audio signal includes the steps of:

generating first parity words and second parity words; and adding the first parity words and the second parity words to the digital audio signal as the error correction code words.

5. The method according to claim 1, wherein:

the digital audio signal includes odd-numbered words and even-numbered words;

in the step of sequentially arranging the rectangularly-arrayed words of the coded digital audio signal:

the words of the digital audio signal arranged into each of the rows are separated into even-numbered words and odd-numbered words; and the even-numbered words are arranged consecutively in a first half of the row and the odd-numbered words are arranged consecutively in a second half of the row.

6. The method according to claim 5, wherein the step of adding error code words to the digital audio signal includes the steps of:

generating first parity words; and adding the first parity words to the digital audio signal as the error correction code words.

7. The method according to claim 5, wherein the step of adding error code to the digital audio signal includes the steps of:

generating first parity words and second parity words; and adding the first parity words and the second parity words to the digital audio signal as the error correction code.

8. The method according to claim 1, wherein:

each digital soundtrack has two opposed edges;

the method additionally comprises the step of adding synchronizing words to the digital audio signal, the synchronizing words additionally constituting words of the coded digital audio signal;

in the step of sequentially arranging the rectangularly-arrayed words of the coded digital audio signal, the synchronizing words are placed in a portion of each row; and in the step of recording the rectangularly-arrayed words of the coded digital audio signal, the synchronizing words are recorded as the words closest to one of the edges of at least one of the digital soundtracks.

9. The method according to claim 1, wherein:

in the step of arraying the bits of each of the words of the coded digital audio signal into a rectangular array, the bits of each word are arranged in a rectangular array of m×n bits; and in the step of recording each of the rows of the rectangularly-arrayed words of the coded digital audio signal as a row in the digital soundtracks, each rectangularly-arrayed word is recorded with m bits in the direction perpendicular to the direction of travel, and with n bits in the direction of travel.

10. method according to claim 9, wherein each rectangularly-arrayed word is composed of 16 bits, and m is 4 and n is 4.

11. The method according to claim 1, wherein:

the digital audio signal includes signals representing plural channels;

the step of adding error correction code words to the digital audio signal includes the step of generating an error-detection parity word from selected ones of the words of the digital audio signal as an error correction code to detect errors in the digital audio signal, the error detection parity word additionally constituting words of the coded digital audio signal; and in the step of sequentially arranging the rectangularly-arrayed words of the coded digital audio signal, the error-detection parity word and the selected ones of the words of the digital audio signal wherefrom the error detection code word is generated are arranged in corresponding positions in consecutive rows.

12. The method according to claim 1, wherein:

the step of adding error correction code to the digital audio signal includes the step of generating an error-detection parity word from selected ones of the words of the digital audio signal to detect errors in the digital audio signal, the error detection parity word additionally constituting words of the coded digital audio signal; and in the step of sequentially arranging the rectangularly-arrayed words of the coded digital audio signal, the error-detection parity word and the selected ones of the words of the digital audio signal wherefrom the error detection code word is generated are arranged in corresponding positions in consecutive rows.

13. The method according to claim 12, wherein, in the step of generating the error-detection parity word, the error-detection parity word is generated using a cyclic redundancy check the basis of a CRC code.

14. The method according to claim 4, wherein:

in the step of generating the first parity words and the second parity words:

the first parity words are generated from words including first selected words of the digital audio signal, and the second parity words are generated from words including second selected words of the digital audio signal; and in the step of sequentially arranging the rectangularly-arrayed words of the coded digital audio signal:

the first selected words and the first parity words are all sequentially arranged in one of the rows, the rectangularly-arrayed words of the coded audio signal arranged in successive rows form a two-dimensional array, and the second selected words are arranged on an oblique axis of the two-dimensional array.

15. The method according to claim 14, wherein, in the step of generating the first parity words and the second parity words, the second parity words are additionally generated from the first parity words.

16. The method according to claim 14, wherein, in the step of generating the first parity words and the second parity words, the first parity words are additionally generated from the second parity words.

17. The method of claim 1, wherein, in the step of recording the rectangularly-arrayed words of the coded digital audio signal sequentially arranged in rows in two digital soundtracks on the motion picture film:

one of the digital soundtracks is located adjacent one edge of the picture area; and the other of the digital soundtracks is located in one of a first position and a second position, the first position being located between the other edge of the picture area and one edge of the analog soundtrack, the second position being located adjacent the other edge of the analog soundtrack.

18. A motion picture film with digital and analog soundtracks, the motion picture film having a direction of travel, and comprising:

(a) a picture area having two opposed edges;

(b) an analog soundtrack having two opposed edges; and (c) a digital soundtrack located on the motion picture film in an area other than the motion picture area and the analog soundtrack, the digital soundtrack running in the direction of travel, the digital soundtracks having recorded therein rectangular arrays of bits, each of the rectangular arrays of bits representing one word of a coded digital audio signal comprising words of a digital audio signal whereto error-correction code words have been added, the rectangular arrays of bits disposed in two or more rows, of one or more bits each, in a direction perpendicular to the direction of travel, successive rows of the rectangular arrays of bits being recorded in the direction of travel, such that the bits of each rectangularly-arrayed word are arrayed at least in the direction of travel, and successive ones of the rectangularly-arrayed words are recorded in the direction of travel.

19. The motion picture film according to claim 18, wherein error-correction code includes first parity words.

20. The motion picture film according to claim 19, wherein:

each first parity word is generated in response to selected words of the digital audio signal; and the rectangular arrays of bits representing the selected words and the first parity words are all recorded in one row.

21. The motion picture film according to claim 18, wherein:

the digital audio signal includes plural words including even-numbered words and odd-numbered words; and the rectangular arrays of bits disposed consecutively in a first half of each row represent the even-numbered words, and the rectangular arrays of bits disposed consecutively in a second half of each row represent the odd-numbered words.

22. The motion picture film according to claim 18, wherein:

each digital soundtrack has two opposed edges; and the rectangular arrays of bits additionally represent synchronizing words, the rectangular arrays of bits representing the synchronizing words being the rectangular arrays of bits located in each row closest to the edge of the digital soundtrack.

23. The motion picture film according to claim 18, wherein the rectangular arrays of bits representing each word of the coded digital audio signal each have m bits sequentially arranged in the direction perpendicular to the direction of travel and n bits arranged in the direction of travel.

24. The motion picture film according to claim 23, wherein each word of the coded digital audio signal is composed of 16 bits, m is 4, and n is 4.

25. The motion picture film according to claim 18, wherein:

the digital audio signal includes signals representing plural channels; and the rectangular arrays of bits in each row represent the words of the signals representing the respective channels, the rows of rectangular arrays of bits being sequentially arranged such that the signals representing the respective channels are cyclically recorded in the direction of travel.

26. The motion picture film according to claim 18, wherein the rectangular arrays of bits additionally include a rectangular array of bits representing an error-detection parity word generated from selected ones of the words of the coded digital audio signal and the rectangular array of bits representing the error-detection parity word and the rectangular array of words wherefrom the error-detection parity word is generated are arranged in corresponding positions in consecutive rows.

27. The motion picture film according to claim 26, wherein the error-detection parity word is generated using a cyclic redundancy check code.

* * * * *